US011525695B2

(12) United States Patent
Suleiman Ahmad Almousa

(10) Patent No.: US 11,525,695 B2
(45) Date of Patent: Dec. 13, 2022

(54) SMART GLASS FOR VEHICLES

(71) Applicant: Ahmad Suleiman Ahmad Almousa, Abu Dhabi (AE)

(72) Inventor: Ahmad Suleiman Ahmad Almousa, Abu Dhabi (AE)

( * ) Notice: Subject to any disclaimer, the term of this patent is extended or adjusted under 35 U.S.C. 154(b) by 77 days.

(21) Appl. No.: 17/048,440

(22) PCT Filed: Jan. 6, 2020

(86) PCT No.: PCT/IB2020/050045
§ 371 (c)(1),
(2) Date: Oct. 16, 2020

(87) PCT Pub. No.: WO2021/079200
PCT Pub. Date: Apr. 29, 2021

(65) Prior Publication Data
US 2022/0065648 A1    Mar. 3, 2022

Related U.S. Application Data

(60) Provisional application No. 62/924,836, filed on Oct. 23, 2019.

(51) Int. Cl.
*G06F 3/14* (2006.01)
*G01C 21/36* (2006.01)
*G02B 27/01* (2006.01)
*H04N 5/33* (2006.01)

(52) U.S. Cl.
CPC ....... *G01C 21/365* (2013.01); *G02B 27/0101* (2013.01); *G06F 3/14* (2013.01); *G02B 2027/0134* (2013.01); *G02B 2027/0138* (2013.01); *G02B 2027/0141* (2013.01); *H04N 5/33* (2013.01)

(58) Field of Classification Search
CPC ...... G01C 21/365; G02B 27/0101; G06F 3/14
USPC ......................................................... 345/419
See application file for complete search history.

(56) References Cited

U.S. PATENT DOCUMENTS 9,400,385 B2 * 7/2016 Hing .................. G02B 27/01
10,081,370 B2 * 9/2018 Roth .................... H04N 13/282
2014/0354691 A1 * 12/2014 Hing .................. G02B 27/01
345/633

(Continued)

FOREIGN PATENT DOCUMENTS

DE    102017122170 A1    3/2018
EP         3444139 A1    2/2019
WO      2018145958 A1    8/2018

*Primary Examiner* — Thomas J Lett
(74) *Attorney, Agent, or Firm* — Hayes Soloway PC

(57) ABSTRACT

There is provided a system for displaying information to a user of a vehicle, including a smart glass for displaying the information as three dimensional (3D) elements, a navigation-assisting component and a central database, wherein the smart glass and the navigation-assisting component are in communication with the central database. This database stores the information and aids in sending and displaying relevant and updated information on the smart glass in real-time, depending on a location through which the vehicle is being maneuvered. Further, the information is displayed on the smart glass through markerless Augmented Reality (AR) technology, thereby eliminating a need for external devices or projectors for displaying the information.

15 Claims, 3 Drawing Sheets

(56) References Cited

U.S. PATENT DOCUMENTS

| | | | |
|---|---|---|---|
| 2014/0354692 A1* | 12/2014 | Ng-Thow-Hing | ............................ G02B 27/0101 345/633 |
| 2015/0062168 A1* | 3/2015 | Ng-Thow-Hing | ...... G06F 3/017 345/633 |
| 2015/0145995 A1* | 5/2015 | Shahraray | ............... H04L 67/12 348/148 |
| 2015/0331238 A1* | 11/2015 | Roth | ...................... B60Q 9/008 348/115 |
| 2019/0017839 A1* | 1/2019 | Eyler | ...................... G01C 21/32 |
| 2019/0369391 A1* | 12/2019 | Cordesses | ............. A63F 13/803 |

* cited by examiner

SMART GLASS FOR VEHICLES

CROSS-REFERENCE TO RELATED APPLICATIONS AND PRIORITY

This patent application claims priority from PCT Patent Application No. PCT/IB2020/050045 filed Jan. 6, 2020, which claims priority from U.S. Provisional Patent Application No. 62/924,836 filed Oct. 23, 2019. Each of these patent applications are herein incorporated by reference in their entirety.

FIELD OF THE INVENTION

The present invention relates to a smart glass for vehicles, and more particularly to a smart glass functioning based on markerless augmented reality.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The windshield or windscreen of an automobile is the front window, which provides visibility to the driver while driving. Conventional windshields protect occupants of the vehicle from wind and flying debris, dust, insects, rocks and provide an aerodynamically formed window towards the front side of the vehicle.

Road signs (including directional signboards, warning signs, billboards, traffic lights, road marking and protection barriers) occupy a large space on roadways, and the costs incurred for manufacturing, importing, installing and maintaining these signs or boards is expensive. In addition, damaged road signs can be an eyesore, and in some cases, it can threaten the safety on the road, for example, vehicles tend to crash into these signs during road accidents. It should be noted that, these signs are installed after paving the road, and usually intended for the drivers and not for pedestrian. Augmented Reality is an interactive experience of a real-world environment where the objects that reside in the real-world are enhanced by computer-generated perceptual information, sometimes across multiple sensory modalities, including visual, auditory, haptic, somatosensory and olfactory, it is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive and digitally manipulated. Information about the environment and its objects is overlaid on the real world. This information can be virtual or real.

Augmented Reality—based head up displays (HUD) are currently being employed on windshields. The Head-up Display (HUD) is a multimedia system projecting data on the windshield, using a projector device or any additional device which may aid projecting the information on the windshield. However, this is highly disadvantageous as these devices used for projecting information distract and seriously hinder the normal line of vision and thereby pose a threat for drivers. Other disadvantages associated with the HUD includes limited intelligence, short life span and low light efficiency causing difficulty for drivers during night time.

Accordingly, there exists a need for a system which eliminates the need for an external projector device, while displaying useful information to the driver via the windshield. Also required, is a system for displaying necessary information to drivers without the need to actually manufacture, install or maintain physical signboards, through which governments can save huge amounts of money.

SUMMARY OF THE INVENTION

Therefore it is an object of the present invention to propose a system which eliminates the need for an external projector device, while displaying useful information to the driver via the windshield and thereby eliminating the need for manufacturing, installing and maintaining physical signboards on roadways.

The present invention involves a system for displaying information to a user of a vehicle, the system comprising a smart glass for displaying the information as three dimensional (3D) elements, a navigation-assisting component and a central database, wherein the smart glass and the navigation-assisting component are in communication with the central database, which stores the information and aids in sending and displaying relevant and updated information on the smart glass in real-time, depending on a location through which the vehicle is being maneuvered.

In another embodiment of the present invention, the displayed information comprises road signs, barriers or advertisements relevant to the location through which the vehicle is being maneuvered.

In another embodiment of the present invention, the information is displayed on the smart glass using Artificial Intelligence (AI) and Augmented Reality (AR) technologies.

In another embodiment of the present invention, the information is displayed on the smart glass using markerless Augmented Reality (AR) technology, thereby eliminating a need for external devices or projectors for displaying the information.

In another embodiment of the present invention, the navigation-assisting component is a Global Positioning system (GPS) component.

In another embodiment of the present invention, the system further comprises a plurality of sensor components and a plurality of cameras located at multiple locations on the vehicle and on the smart glass for enabling complete coverage of a surrounding environment.

In another embodiment of the present invention, the plurality of sensor components comprise location sensors, motion, light and acceleration sensors.

In another embodiment of the present invention, displaying relevant and updated signals on the smart glass in real-time, eliminates a need for installation of physical signboards on roadways.

In another embodiment of the present invention, the plurality of cameras have infrared (IR) imaging functionalities.

In another embodiment of the present invention, the central database is managed by a government entity, which regularly updates the central database with new road signs or warnings.

In another embodiment of the present invention, the system further comprises a central processing unit (CPU) programmed for processing data received from the navigation-assisting component and the plurality of cameras; and generating and displaying relevant information on the smart glass in connection with the central database.

In another embodiment of the present invention, the light and acceleration sensors measure an illumination value from the surrounding environment, and subsequently match the measured illumination value when brightening the elements being displayed on the smart glass.

In another embodiment of the present invention, the system further comprises a 3D digital compass.

In another embodiment of the present invention, the smart glass is automatically activated on turning on the vehicle containing the smart glass.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 2 (b) illustrates how objects are displayed on the smart glass (while driving on a new road without road furniture) in accordance with the present invention.

DETAILED DESCRIPTION OF THE INVENTION

Figure 1:
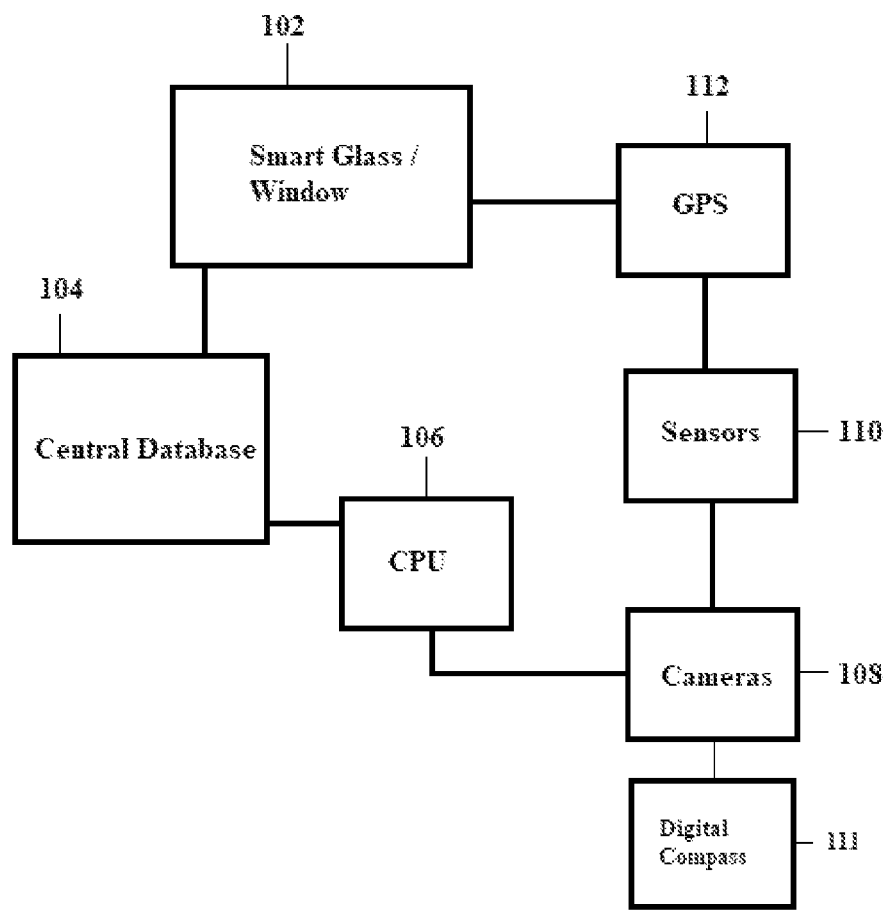
FIG. 1 is a block diagram of the smart glass system in accordance with the present invention.

The aspects of a smart glass functioning based on markerless augmented reality according to the present invention will be described in conjunction with FIGS. 1-2. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The proposed smart glass in accordance with the present invention is positioned to cover, or fixed in place of the entire windshield of a vehicle on which the smart glass is implemented. Accordingly, a user or driver of the vehicle with the smart glass, views outdoor environment or roads through the smart glass on the vehicle windshield. Implementation of the proposed smart glass on vehicles results in smart and visually appealing roadways or highways, eliminating the need for guidance signs, warning signs or advertisement hoardings on the roads. However, drivers or users within the smart glass implemented vehicles will continue to view required warning or direction signs, necessary barriers etc. through the smart glass—thereby ensuring road safety while creating a new environment and enhancing the aesthetics of roadways and its associated surrounding areas.

The strategic vision of the proposed smart glass in vehicles is in line with future strategic visions of global industrial products, which are oriented towards using artificial intelligence (AI) and augmented reality (AR) to achieve greater productivity. This productivity is achieved without significant consumption of resources and results in saving huge sums of money on road projects and roadway maintenance by eliminating street furniture (defined as objects or pieces of equipment installed along streets and roads for various purposes) and associated manufacturing, installation, transport and maintenance works.

In a preferable embodiment of the present invention, the smart glass is designed for displaying elements three-dimensionally (3D) through markerless Augmented Reality (AR) technology, thereby eliminating the need for any external devices or projectors for performing the same. The elements being displayed include all necessary road signs—traffic signals, guidance or direction signs, warning signs and regulation signs. In another embodiment, the smart glass also displays advertisements (which are traditionally projected on roadsides using billboards or hoardings) in a way that the driver's concentration or view remains unhindered. Smart glass is not applied to ordinary and current automotive glass, but the complete replacement of ordinary glass that does not meet the specifications of the work on augmented reality technology because the smart glass designed for this invention is 3D vision covering the central field of view of the user and used as a transit station for the user's eye to see the real world as it is but in an enhanced way to see the driver or the user with the help of augmented reality technology for the elements added to the realistic road in the form of triple object dimensions.

As depicted using a block diagram in FIG. 1, the system for implementing the smart glass 102 within a vehicle further includes components such as a Global Positioning system (GPS) navigation component 112, a plurality of sensor components 110 including location detecting and mapping sensors, motion and acceleration sensors, and cameras 108 with infrared (IR) imaging functionalities and a 3D digital compass 111. All of the additional components (external or internal) which help in enhancing the functionalities of the smart glass are manufactured and positioned in such a way that the driver's vision is not compromised at any instance. Accordingly, all the components are designed to be incorporated within or in proximity to the smart glass, thereby designing, manufacturing and installing the smart glass in combination with all other necessary components as a single piece or device.

In another embodiment, a plurality of cameras 108 function in combination with the smart glass. These cameras are located on various locations on the vehicle and on the smart glass 102 in order to enable 360° coverage of the surrounding environment. Accordingly, the plurality of cameras are powered by 3D imaging technology including infrared and RGB specifications with deep sensing capabilities—for enhanced monitoring of the environment and to provide safer driving experiences. Further, the screen used for the smart glass implementation is designed to support 3D vision, covering the driver's central field of vision—which is 90° temporally to central fixation, 50° superiorly and nasally and 60° inferiorly.

In another embodiment of the present invention, the system further comprises a plurality of sensor components and a plurality of cameras located at multiple locations on the smart glass for enabling complete coverage of a surrounding environment (distributed geometrically and technically within the perimeter of the smart car glass) without any impact on the driver's vision. In another embodiment of the present invention, the external parts and components of the device are manufactured and positioned inside or around the glass as a single piece connected with the car glass (in a Tablet form), thereby not affecting the driver's vision through the glass.

The smart glass is constantly in communication with a central database 104 managed by a governmental traffic department, which regularly updates the database 104 with new road signs or warnings. The database 104 stores all types of traffic signals and road signs, and aids in sending and displaying appropriate and updated signals on the smart glass in real-time, depending on where the vehicle is being maneuvered. A section of this database is also accessible and managed by commercial parties who are interested in using the smart glass for advertisements. All data being displayed on the smart glass is in the form of 3D models or elements, which give users the illusion that these elements are actually still present on the physical roads.

In another preferable embodiment, a difference in an angle of vision of a user or driver will not affect the clarity, or how the elements being displayed on the smart glass are perceived or interpreted by the user or driver. In other words, a person viewing the outside environment through the smart glass (from any location or angle within the vehicle) will be able to view all elements being displayed on the smart glass with the equal clarity and precision. The basic principle behind working of the smart glass in accordance with the present invention is markerless augmented reality technology. This technology enables direct overlaying of 3D content onto a screen or any other physical platform, wherein augmentation occurs in real-time and within the context of the present environment (instead of creating artificial environments to replace the real environment with a virtual one).

In accordance with the present invention, all necessary information that should be perceived and viewed by a driver (traffic signals, road signs and directional signs), is displayed on the smart glass 102 as and when required. There is present a central processing unit (CPU) 106 programmed for generating and displaying 3D virtual objects on the smart glass 102, and possessing the processing capacity to support a powerful graphics processor such as Qualcomm (XR1 processor). On turning on the vehicle containing the smart glass in accordance with the present invention, the smart glass is also automatically activated and does not need to be initiated or started separately by the driver or user of the smart glass. This is mainly because the smart glass is a centrally operated device with a centrally controlled and managed database—which cannot be altered or tampered with by an external or unauthorized individual. Further, the smart glass is programmed to be compatible and may be connected with any operating system.

A user driving to a destination using the vehicle implemented with the smart glass in accordance with the present invention will not require prior knowledge regarding the roads or associated environments that the user may encounter en route to the destination. On turning on the vehicle, the smart glass is simultaneously turned on and all associated external and internal components working in connection with the smart glass are activated because the AR technology used in the present invention (specifically the technique without tags in real reality), Markerless AR, is location-based and supports synchronous localization, mapping and special sensors and cameras. In another embodiment of the present invention, manufacturing the device as one piece is connected all parts of the other are easily implementable owing to usual large size and rolling in manufacturing for auto glass which is make it the biggest strengths of this device and what distinguishes it from many other inventions. Further, based on its work on augmented reality technology and virtual reality which face problems due to weight and size (such as lenses, glasses, computers and smartphones), it is aimed to create a single, all-in-one device which incorporates all elements of AR technology and works perfectly and artistically is feasible without any problem of weight and size.

In accordance with the present invention, the GPS navigation device 112 provides an initial route towards a desired destination, as input by the user. This initial route is determined through collection of both latitudinal and longitudinal coordinate data while driving, which is subsequently passed on to the CPU 106 of the smart glass 102. The CPU 106 sends the received latitudinal and longitudinal coordinate data to a data center (preferably controlled by a governmental traffic control center)—which is a collection of servers connected to each other, and designed or programmed to function based on the data received. This data center includes a comprehensive geographical database 104 complete with necessary updated information pertaining to roadways in a region of interest. The database 104 also enables associating augmented reality content with a particular geographical location and simultaneously projecting the augmented reality content onto the smart glass 102. There is no need for any additional initiation from the user's side (such as scanning a QR code or image) to facilitate projecting the augmented reality content onto the smart glass 102. In another embodiment of the present invention, the central database is managed by a government entity or any road management agency or organization contracted by the local government for road management which regularly updates the central database with new road signs or warnings according to the international standards of roads and is always updated on existing or new roads in line with the standards of public safety and traffic.

Further, during the process of navigating through a determined route (provided by the GPS navigation device), the plurality of cameras 108 located on various locations on the vehicle and on the smart glass 102, constantly monitor the surrounding environment. Theses cameras, powered by 3D imaging technology including infrared and RGB specifications with deep sensing capabilities, also work in combination with motion sensors.

Figure 2:
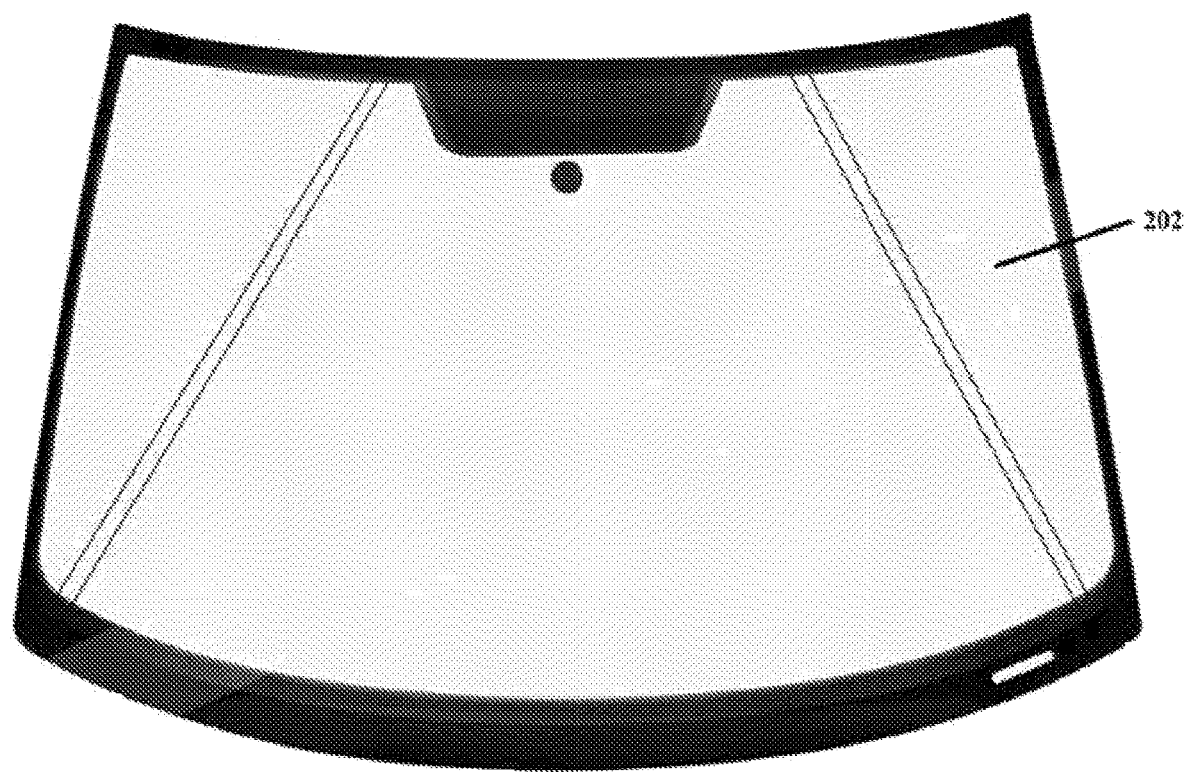
FIG. 2 (a) shows a normal windshield not employing the smart glass (while driving on a new road without road furniture) in accordance with the present invention.
Figure 2:
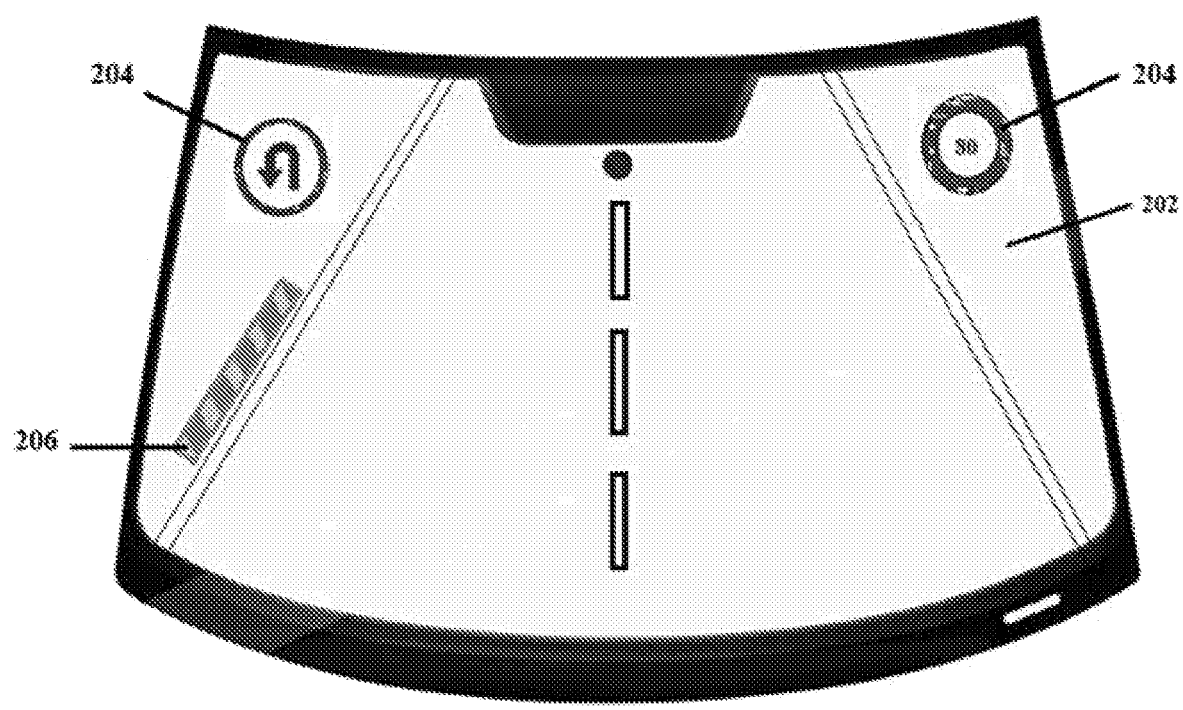

FIG. 2 (*a*) shows a normal windshield not employing the smart glass in accordance with the present invention, and FIG. 2 (*b*) illustrates how objects are displayed on the smart glass in accordance with the present invention. A driver using a vehicle without a smart glass windshield views the outside environment as depicted in FIG. 2 (*a*). In both scenarios, the road is devoid of any road furniture. However, in accordance with the present invention, and as shown in FIG. 2 (*b*), all necessary and required signs or barriers to be seen by the driver, are displayed as 3D objects on the smart glass 202. The driver views road signs 204 and possible temporary barriers 206 as 3D objects displayed on the smart glass 202, thereby enabling the roadways to be devoid of any physical signs or barriers, and resulting in smart and visually appealing roadways or highways and enhanced safety for users of the same.

At the same time while driving, the cameras of surrounding environment working with deep sensor and infrared imaging specifications with motion sensors to collect deep information and 3D data. A 3D object (an upcoming road sign, road barrier, emergency warning or direction board) which is to be shown on the smart glass at a particular distance appears on the smart glass with a hologram effect. The plurality of cameras detect the surrounding environment, and the geographical database, which functions in combination with the cameras, sends information pertaining to the particular 3D object which is to be shown on the smart glass, at a particular time instant. The plurality of cameras, utilize light reflected from the motion sensors to determine an accurate target distance. The time taken for a ray or pulse of light to transition back and forth from the camera to a particular subject ensures that the 3D objects being shown are placed as would be seen in real space.

RGB cameras work using normal ambient lighting for simultaneously interpreting and then designating necessary 3D objects on the smart glass based on the detected landscape or surrounding environment. These cameras, using conventional images, provide depth information and the distance to a sensor using each pixel. Further, the cameras, instead of performing recording functions, work as a medium to assist in augmented reality technology and thereby displaying elements in the best possible way, through data transmission along with a combination of integrated optics and holograms. This is owing to light and acceleration sensors which measure the illumination of the natural environment and match the measured illumination when lighting the default objects, in order that these objects look more natural and also by calculating an accuracy of the distance prior to displaying the object as a holographic.

Analog signals from reflected infrared signals are converted into a digital format by combining a 2D image with obtained location information, and then processing the 2D images to be displayed a s 3D objects or holograms on the smart glass. However, the displayed 3D objects floating on the smart glass will not distract the driver or cause discomforts such as nausea with the help of a CPU that has a massive processing capacity to support a powerful graphics processor to work on the technology of augmented reality with very sophisticated specifications. Through regular updating of the central database, newly added elements on the roadways are constantly added and integrated, for reflecting the same on the smart glass at the right time and place while driving. This is regardless of the vehicle speed, location or distance between an object.

In addition to saving huge amounts of money on private or government agencies that implement road projects for implementing smart and agile roadways, the implementation of smart glass for vehicles may also serve as a new source of investment and national income. The enhanced road space may be rented to competitive companies for advertising and other commercial uses in order to achieve large financial returns with limited material cost. The proposed invention also is most advantageous to the surrounding environments considering that the smart glass helps to reduce environmental pollution by eliminating the need for street furniture materials and associated stages of manufacturing (including smoke and dust generation, transportation, installation and removal procedures).

In another embodiment of the present invention, a plurality of light and acceleration sensors are also used in the proposed system to measure an illumination value from the natural surrounding environment, and subsequently match the measured illumination value when brightening the objects being projected on the smart glass. This feature enables the displayed 3D objects to look natural. Further, accurate calculation of the distance between the locations where an object is to be shown enables the object to be perceived as naturally existing. Further, to enhance the experience, visibility of a displayed object increases as the vehicle approaches and visibility diminishes as the vehicle moves away from the location wherein the object was displayed.

In another embodiment of the present invention, the smart glass is automatically activated on turning on the vehicle containing the smart glass and its an integral part of any car as it is mechanically and electrically connected, In the sense that when the vehicle engine is turned on and ready for driving mode, the smart car glass device works automatically and does not need to be operated by the driver or user because it is directly connected to the vehicle and cannot be controlled individually. The reason for this is that it is a centrally operated device that does not allow the user any role to control the input and output, In another embodiment of the present invention, when the car is working and the smart car windshield is turned on, the operating system of the car starts operating immediately which is designed and developed for the purpose of reaching all the results that support the task of the device by working on augmented reality technology and linking the best way to the internal and external components of the device, which in turn also works directly as soon as the system works, When the start of the driving the primary outcome is to start of smart glass work in all its parts and systems internal and external. The strategic vision of the invention of smart glass cars is in line with the future strategic visions of global industrial products that are oriented towards artificial intelligence to achieve greater productivity, without significant consumption of resources and saving huge sums of money on road projects and maintenance by reducing the largest quantity of road furniture and its various works of manufacturing, installation, transport and maintenance.

The purpose of the invention of the smart glass device for cars is to enter the new era of the graceful and smart ways and begin to apply them in practice with the help of augmented reality technology. Where it is often car companies and Factories and investment companies use it limited targets which are raising the specifications of the car technically to keep pace with technological development and enter into the field of artificial intelligence and marketing of its products and continue in the market competition with other companies and factories. But in our invention we will achieve all of the above mentioned targets of car companies with the achievement of the essence and the main requirement of the idea which is start a new phase—smart, graceful roads that use artificial intelligence by completely dispense all guiding and guidance road furniture and create a new environment for road Without the driver feeling the difference and driving the vehicle in complete safety as if these added elements are truly real and located in the right place and the right time for the user while driving. In addition to saving billions of dollars on government agencies that implement road projects, they can make smart and agile roads through the implementation of the invention of smart glass for cars as a source of investment and national income by renting the enhanced road space for competitive companies and use it in advertising and commercial uses to achieve a very large financial return with limited material cost.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A system for displaying information to a user of a vehicle, the system comprising:
  a smart glass for displaying the information as three dimensional (3D) elements;
  a navigation-assisting component;

a central database, a plurality of sensor components such as location sensors, motion, light and acceleration sensors; and a plurality of cameras located at multiple locations on the vehicle and on the smart glass for enabling complete coverage of a surrounding environment;

wherein the smart glass and the navigation-assisting component are in communication with the central database, which stores the information and aids in sending and displaying said information on the smart glass, depending on a location through which the vehicle is being maneuvered, and wherein the light and acceleration sensors measure an illumination value from the surrounding environment, and subsequently match the measured illumination value when brightening the elements being displayed on the smart glass.

2. The system in accordance with claim 1, wherein the displayed information comprises road signs, barriers or advertisements relevant to the location through which the vehicle is being maneuvered.

3. The system in accordance with claim 1, wherein the information is displayed on the smart glass using Artificial Intelligence (AI) and Augmented Reality (AR) technologies.

4. The system in accordance with claim 1, wherein the information is displayed on the smart glass using markerless Augmented Reality (AR) technology, thereby eliminating a need for external devices or projectors for displaying the information.

5. The system in accordance with claim 1, wherein the navigation-assisting component is a Global Positioning system (GPS) component.

6. The system in accordance with claim 1, wherein displaying relevant and updated signals on the smart glass in real-time, eliminates a need for installation of physical signboards on roadways.

7. The system in accordance with claim 1, wherein the plurality of cameras have infrared (IR) imaging functionalities.

8. The system in accordance with claim 1, wherein the central database is managed by a government entity, which regularly updates the central database with new road signs or warnings.

9. The system in accordance with claim 1, further comprising a central processing unit (CPU) programmed for processing data received from the navigation-assisting component and the plurality of cameras; and generating and displaying relevant information on the smart glass in connection with the central database.

10. The system in accordance with claim 9, wherein the CPU supports a graphics processor.

11. The system in accordance with claim 1, further comprising a 3D digital compass.

12. The system in accordance with claim 1, wherein the smart glass is automatically activated on turning on the vehicle containing the smart glass, without the need to be initiated separately by a driver or user of the smart glass.

13. The system in accordance with claim 1, wherein the information is displayed on the smart glass in real-time.

14. The system in accordance with claim 1, wherein the smart glass is designed to support 3D vision, covering a driver or user's central field of vision.

15. The system in accordance with claim 1, wherein the smart glass is manufactured as a single piece, thereby not affecting a driver or user's vision through the smart glass.

* * * * *